Aug. 11, 1931.  E. E. HANS  1,818,392

LUBRICATING SYSTEM

Filed Oct. 20, 1928    2 Sheets-Sheet 1

INVENTOR.
Edmund E. Hans
BY
Kenyon & Kenyon
ATTORNEYS.

Aug. 11, 1931.  E. E. HANS  1,818,392
LUBRICATING SYSTEM
Filed Oct. 20, 1928   2 Sheets-Sheet 2
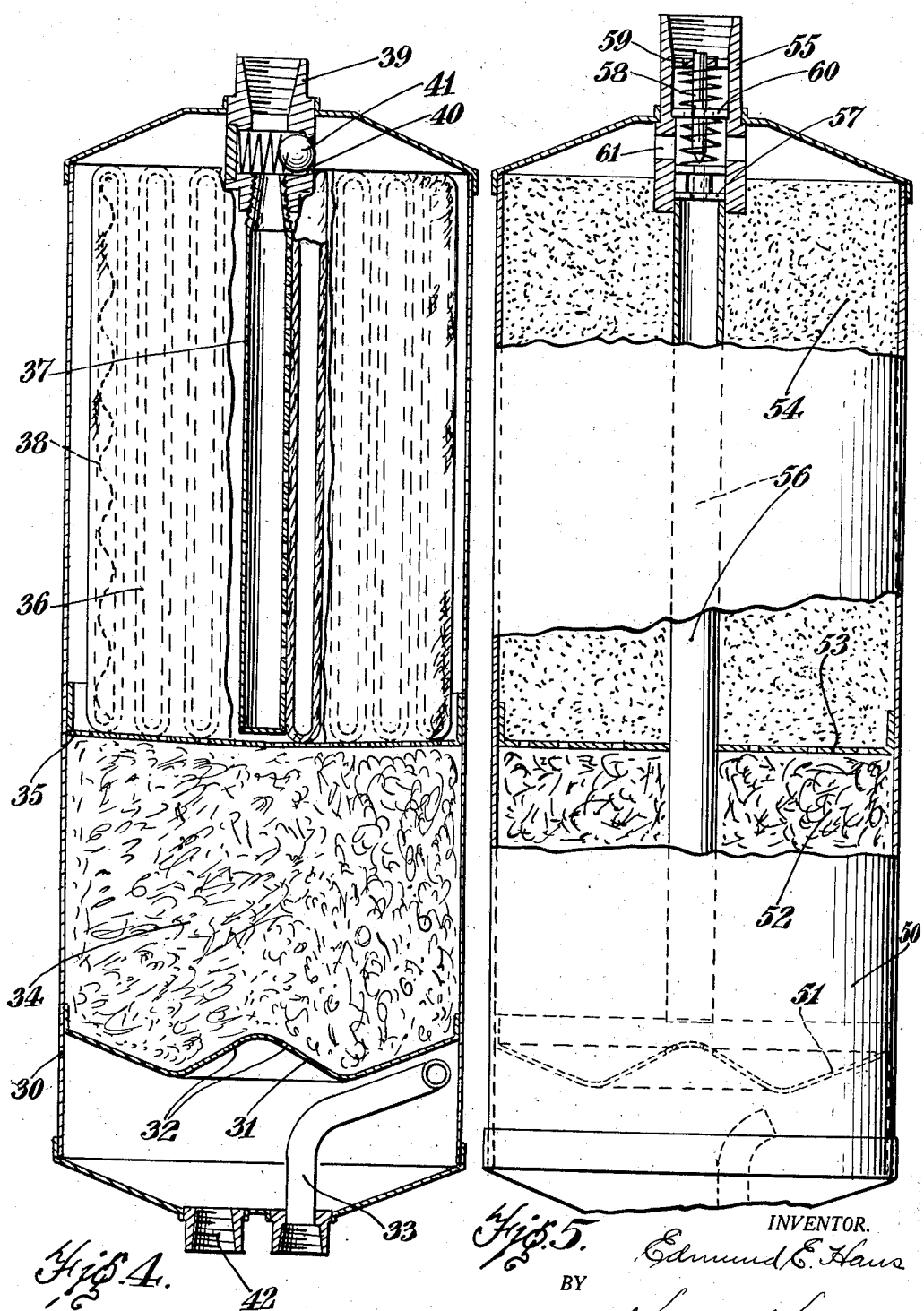

Patented Aug. 11, 1931

1,818,392

UNITED STATES PATENT OFFICE

EDMUND E. HANS, OF DETROIT, MICHIGAN

LUBRICATING SYSTEM

Application filed October 20, 1928. Serial No. 313,739.

This invention relates to lubricating systems for internal combustion engines for automobiles and more particularly to filtering means in combination with lubricating systems.

This invention has as an object an improved and highly efficient filter of simple and inexpensive construction and also improved means for ensuring adequate supply of oil to the bearings at all times.

The lubricating systems for certain types of automobile engines are so designed that at idling speed the oil pressure in the system is insufficient to force the oil through a filter. It has heretofore been the practice, in such cases, to provide a branch line for supplying oil to the filter. According to applicant's invention the branch line is dispensed with and the filter is included in the main line to the bearings. To insure adequate supply of oil to the bearings, there is provided a bypass around the filter in which is provided a valve that opens at low pressure and at high pressures. At intermediate pressures, such as are developed when the engine is running at the usual operating speed and the filter is passing oil freely, the valve remains closed and prevents the flow of oil through the bypass. Should the filter become clogged and thus produce a higher than normal pressure in the system, the bypass valve will open and permit direct flow of oil to the bearings.

This type of valve may be used in conjunction with any type of filter but the improved filter in combination with which the above described valve is herein disclosed consists principally of a closed casing having a settling chamber at the bottom thereof. Oil from the crank case is delivered into this chamber in which the solid impurities and water are permitted to settle out. Above the settling chamber there is provided a coarse filtering medium and then a fine texture filtering medium through which the oil passes successively. The larger particles which do not settle out in the settling chamber are removed by the coarse filtering material so that they do not reach the fine filtering medium. The minute particles left in the oil are removed therefrom by the fine texture filtering medium. By removing the larger particles from the oil before it is passed to the fine texture filtering medium the latter does not become clogged as quickly as it otherwise would. Moreover it permits passing the oil through the fine texture medium at a very high rate of speed.

Other objects, novel features and advantages of this invention will be apparent from the following specification and accompanying drawings, wherein Fig. 1 is a vertical section through a filter embodying the invention.

Fig. 4 is a vertical section through a modified form; and

Fig. 5 is a side elevation partly broken away of a still further modification.

Figure 1:
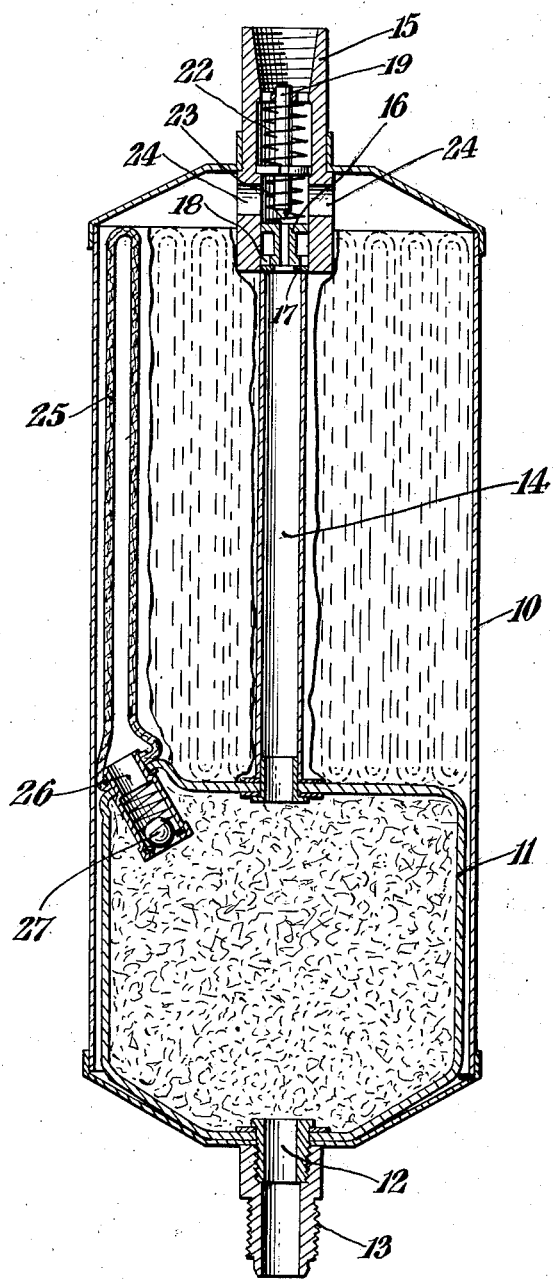

In Fig. 1, 10 designates the cylinder casing. In the lower part of the casing there is provided a container 11, within which is a body of coarse filtering material, such for example as mineral wool or the like, which develops but little if any resistance to the flow of oil. This chamber is provided with an inlet 12 and a nipple 13 is provided for use in connecting the pipe by which oil to be filtered is supplied to the container. A bypass pipe 14 leads from the container 11 to a tubular member 15 mounted in the top wall of the casing 10, and constitutes the outlet from the filter. A spool-like member 16 is slidably mounted in the tubular member 15 and its downward movement is limited by a collar 17. The lower rim of the spool is slotted as at 18 for a purpose which will become apparent later. A plunger 19 has its upper end slidably mounted in a guide 20 and is provided with a slotted disk 21 which is slidably mounted in the bore of the member 15. A coil spring 22 is interposed betwen the guide 20 and the disk 21 and a coil spring 23 is interposed between the disk 21 and the spool-like member 16. Apertures 24 arranged below the disk 21 afford a communication between the casing and the interior of the tubular member 15.

An envelope 25 of fine texture filtering material is wound spirally around the pipe 14 but does not communicate with the same. This envelope is preferably composed of canton flannel although it may be composed of any other suitable fine texture filtering material. A conduit 26 in which there is provided a check valve 27 leads from the chamber 11 into the envelope 25 and affords a passageway for oil from the chamber 11 into the envelope.

Figure 2:
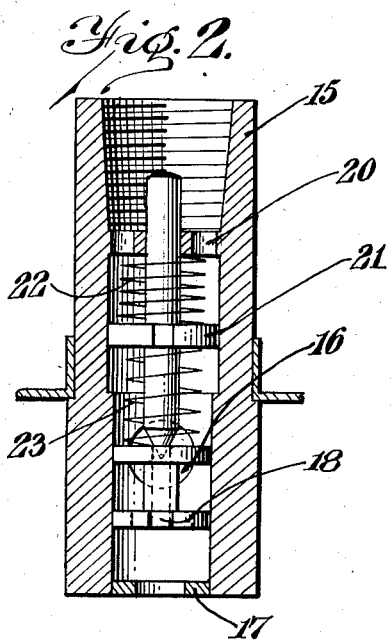
Figs. 2 and 3 are vertical sections through the bypass valve.
Figure 3:
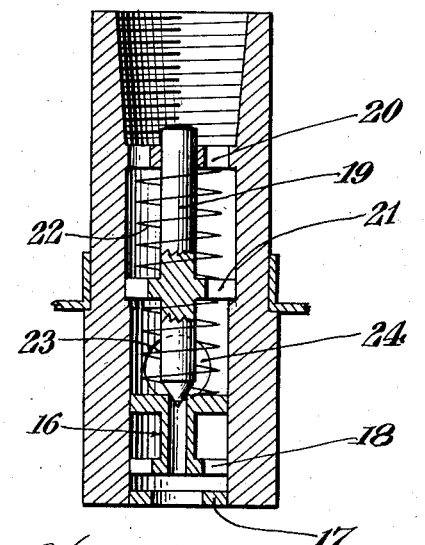

When the above described filter is in use, oil to be filtered is conducted into the chamber 11 from whence it passes either through the pipe 14 or through the envelope 25 and thence out through the tubular member 15 according to the conditions prevailing. The spring 23 is so designed that at low oil pressure the spool-like member 16 is pressed against the collar 17 thus allowing free flow of oil through the bypass 14 and the check valve 27 is so designed that it remains closed at such low pressures. However, upon increase of pressure the check valve 27 is opened and the spool 16 is lifted into the position shown in Fig. 3. The plunger 19 now closes the bore of the spool-like member 16 so that oil cannot flow through the pipe 14 but must pass into the envelope 25. The oil, after passing through the walls of the envelope escapes through the apertures 24 into the upper part of the tubular member 15. This is the normal operation of the filter. However, should the walls of the envelope 25 become clogged, thereby bringing about an increase of pressure in the casing and bypass 14, the spool-like member 16 and plunger 20 will be lifted against the action of the spring 22 until the upper rim of the spool-like member 16 attains the position shown in Fig. 2. In this position the oil may pass through the slots and from the under side of the top rim of the rim around the edge thereof and out through the discharge end of the member 15. Thus under all conditions of operation, a supply of oil to the bearings is assured.

In the modifications disclosed in Fig. 4, 30 designates the casing, near the bottom of which is provided a partition 31 having centrally arranged apertures 32. An inlet pipe 33 extends into the chamber formed by the partition 31 and is so directed as to cause the incoming oil to swirl around the chamber. On the partition 31 is supported a body of coarse filtering material 34 above which is provided a second perforated partition 35. The partition 35 supports a filtering unit 36, consisting of an envelope of fine texture filtering material, such, for example, as canton flannel spirally wrapped about a central perforated tube 37, a spacer 38 being provided to space the adjacent walls of the envelope. The tube 37 is threaded into the lower end of a nipple 39 mounted in the top wall of the casing 30. This nipple is provided with a lateral aperture 40 normally closed by the ball of a check valve 41. In the bottom of the casing there is provided a drainage opening 42 which may be closed by a suitable block, not shown.

The incoming oil is supplied through the pipe 33 to the settling chamber formed between the partition 31 and the bottom of the casing. In this chamber, the heavier particles of dirt and water contained in the oil separate and may be removed through the drainage opening 42. The oil then passes upwardly through the coarse filtering material, which removes the additional particles, but does not present any substantial resistance to the flow of oil therethrough. Next, the oil passes through the perforation in the partition 35 and then through the walls of the filtering envelope and along its spiral channels into the tube 37. The fine texture filtering medium removes the minute particles of dirt and other contaminating material from the oil. Since the fine texture filtering medium has only to remove the minute particles, the oil may be passed therethrough at a much higher velocity than would be the case if the larger particles and the water contained had not been separated by the action of the settling chamber and the coarse filtering material. Should the filtering unit become clogged with dirt and present abnormal resistance to the flow of oil, the relief valve 41 will function to permit direct flow of oil through the nipple without passing through the filtering unit.

The disclosure in Fig. 5 is quite similar to that in Fig. 4. In this modification, the casing 50 is provided with a perforated partition 51 which supports a body of coarse filtering material 52. A perforated partition 53 located above the coarse filtering material 52 supports a body of fine filtering material 54, such filtering material preferably being fine hair or the like. A tubular member 55 is mounted in the top wall of the casing 50 and supports a central tube 56, the lower end of which extends nearly to the partition 51. In this tubular member is slidably mounted a spool-like member 57 which is identical with the spool-like member 16 of Figs. 1 to 3. A plunger 58 is slidably mounted in the tubular member 55 by means of a guide 59 and a disk 60 carried by the plunger. The lower end of this plunger is adapted to enter the bore of the spool-like member 57 when the latter is moved upwardly. Apertures 61 afford communication between the interior of the casing and the interior of the tubular member 55. The operation of the mechanism just described is identical with that of the similar mechanism disclosed in connection with Figs. 1 to 3.

In this modification provision is made for permitting heavy particles of dirt and water to settle out of the oil before the oil is passed through the filtering material. Here, again, the oil first passes through coarse filtering material and then through fine filtering material whereby the previously referred to advantages are obtained.

It is of course apparent that various structural modifications may be made without in any way departing from the spirit of the invention as defined in the appended claims.

I claim:

1. In combination, a filter having an inlet and an outlet, a bypass between said inlet and outlet, and valve means in said bypass operable to prevent flow through said bypass over a definite pressure range and to permit flow through said bypass at pressures above or below said range.

2. In combination, a filter having an inlet and an outlet, a bypass between said inlet and outlet, a tubular valve member slidably mounted in said bypass and a slidable plunger for closing the bore of the valve member upon movement thereof in one direction.

3. In combination, a filter having an inlet and an outlet, a bypass between said inlet and outlet, a tubular valve member slidably mounted on said bypass, a slidable plunger adapted to close the bore of said valve member upon movement of the latter toward the former, and a resilient member tending to separate said valve and plunger.

4. In combination, a filter having an inlet and an outlet, a bypass between said inlet and outlet, a tubular valve member slidably mounted on said bypass, a slidable plunger adapted to close the bore of said valve member upon movement of the latter toward the former, a resilient member tending to separate said valve and plunger, and resilient means opposing movement of said plunger in one direction.

5. In combination, a filter having an inlet and an outlet, a bypass between said inlet and outlet, a tubular valve member slidably mounted in said bypass and movable beyond the juncture of said bypass and said outlet, and a slidable plunger adapted to close the bore of said valve member upon movement of the latter toward the former.

6. In combination, a filter having an inlet and an outlet, a bypass between said inlet and outlet, a tubular valve member slidably mounted in said bypass and movable beyond the juncture of said bypass and said outlet, a slidable plunger adapted to close the bore of said valve member upon movement of the later toward the former, and a resilient member tending to separate said valve member and plunger.

7. In combination, a filter having an inlet and an outlet, a bypass between said inlet and outlet, a tubular valve member slidably mounted in said bypass and movable beyond the juncture of said bypass and said outlet, a slidable plunger adapted to close the bore of said valve member upon movement of the later toward the former, a resilient member tending to separate said valve member and plunger, and resilient means opposing movement of said plunger in one direction.

8. A valve comprising a tubular housing having a lateral aperture, a tubular member slidably mounted in the lower portion of the housing and a slidable plunger adapted to close the bore of said tubular member upon movement of the latter toward the former.

9. A valve comprising a tubular housing having a lateral aperture, a tubular member slidably mounted in the lower portion of the housing, a slidable plunger adapted to close the bore of said tubular member upon movement of the latter toward the former, and a resilient member tending to separate said tubular member and plunger.

10. A valve comprising a tubular housing having a lateral aperture, a tubular member slidably mounted in the lower portion of the housing, a slidable plunger adapted to close the bore of said tubular member upon movement of the latter toward the former, a resilient member tending to separate said tubular member and plunger, and resilient means opposing movement of said plunger in one direction.

11. A filter comprising a casing, a filtering material therein, a bypass tube in said casing having an aperture, a tubular valve member slidably mounted in said bypass tube ahead of said aperture, and a slidable plunger adapted to close the bore in said valve member upon movement of the latter toward the former.

12. A filter comprising a casing, a filtering material therein, a bypass tube in said casing, and valve means in said bypass operable to prevent flow through the bypass over a definite pressure range and to permit flow through said by-pass at pressures above or below said range.

13. A filter comprising a casing having an inlet at the bottom and an outlet at the top, a body of coarse filtering material supported in the lower portion of said casing, a spirally wound envelope of fine texture filtering material contained in the upper portion of said casing, and a conduit leading from the lower portion of said casing into said envelope.

14. A filter comprising a casing having an inlet at the bottom and an outlet at the top, a body of coarse filtering material in the lower portion of the casing, means supporting said material above the bottom of said casing to form a settling chamber, means supporting a spirally wound envelope of fine texture filtering material above said body of coarse filtering material, and a conduit leading from the lower portion of said casing into said envelope.

In testimony whereof, I have signed my name to this specification.

EDMUND E. HANS.